United States Patent [19]

Grosse Bley et al.

[11] Patent Number: 5,585,548
[45] Date of Patent: Dec. 17, 1996

[54] COUNTERFLOW LEAK-DETECTOR UNIT WITH A HIGH-VACUUM PUMP

[75] Inventors: Werner Grosse Bley, Bonn; Thomas Böhm, Köln, both of Germany

[73] Assignee: Leybold Aktiengesellschaft, Germany

[21] Appl. No.: 381,928

[22] PCT Filed: Jul. 6, 1993

[86] PCT No.: PCT/EP93/01744

§ 371 Date: Feb. 14, 1995

§ 102(e) Date: Feb. 14, 1995

[87] PCT Pub. No.: WO94/05990

PCT Pub. Date: Mar. 17, 1994

[30] Foreign Application Priority Data

Aug. 26, 1992 [DE] Germany .............. 42 28 313.2

[51] Int. Cl.⁶ .............................................. G01M 3/02
[52] U.S. Cl. ................................................... 73/40.7
[58] Field of Search .................... 73/40.7, 40; 250/288

[56] References Cited

U.S. PATENT DOCUMENTS

| | | | |
|---|---|---|---|
| 3,968,675 | 7/1976 | Briggs | 73/40.7 |
| 4,294,106 | 10/1981 | Gevaud et al. | 73/40.7 |
| 4,365,158 | 12/1982 | Tallon | 73/40.7 X |
| 4,773,256 | 9/1988 | Saulgeot | 73/40.7 |
| 4,776,207 | 10/1988 | Holme | 73/40.7 |
| 4,779,449 | 10/1988 | Bley et al. | 73/40.7 |
| 4,893,497 | 1/1990 | Danielson | 73/40.7 |
| 4,919,599 | 4/1990 | Reich et al. | 73/40.7 X |
| 4,984,450 | 1/1991 | Bürger | 73/40.7 |
| 5,116,196 | 5/1992 | Baret et al. | 73/40.7 X |
| 5,341,671 | 8/1994 | Baret et al. | 73/40.7 |

FOREIGN PATENT DOCUMENTS

| | | | |
|---|---|---|---|
| 245843 | 11/1987 | European Pat. Off. | 73/40.7 |
| 0283543 | 9/1988 | European Pat. Off. | |
| 481414 | 4/1992 | European Pat. Off. | 73/40.7 |
| 3144503 | 5/1983 | Germany | 73/40.7 |

OTHER PUBLICATIONS

Patent Abstracts of Japan, vol. 12, No. 88 (–0678) (2935) 23, Mar. 1988 & JP, 1, 2 222 138 (Shimadzu Corp) 30, Sep. 1987.

*Primary Examiner*—Thomas P. Noland
*Assistant Examiner*—Daniel S. Larkin
*Attorney, Agent, or Firm*—Harris Beach & Wilcox, LLP

[57] ABSTRACT

A counterflow leak-detector unit (1) with an inlet (2) connected to a test specimen, or a chamber housing a test specimen. A high-vacuum pump (4) produces pressure in a test-gas detector. The inlet (2) to the leak-detector unit is connected to an intermediate line (16) in the high-vacuum pump (4). To increase detection sensitivity without any danger of the pressure in the detector rising to inadmissible levels, a constriction (17) is located between two high-vacuum pump states (5, 6) of the high vacuum pump (4). Pump stages (5, 6) are separated by the intermediate line (16). The inlet (2) to the leak-detector unit (1) is connected to the outlet side of the high-vacuum pump state (5) at a point upstream of the constriction (17).

16 Claims, 2 Drawing Sheets

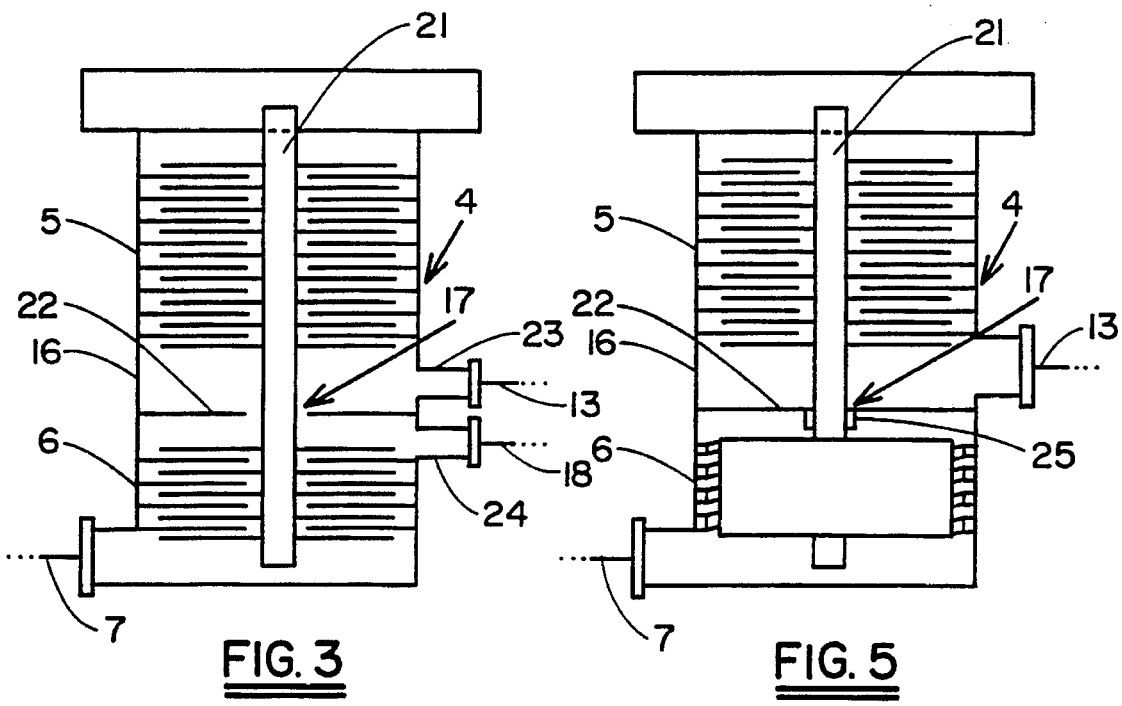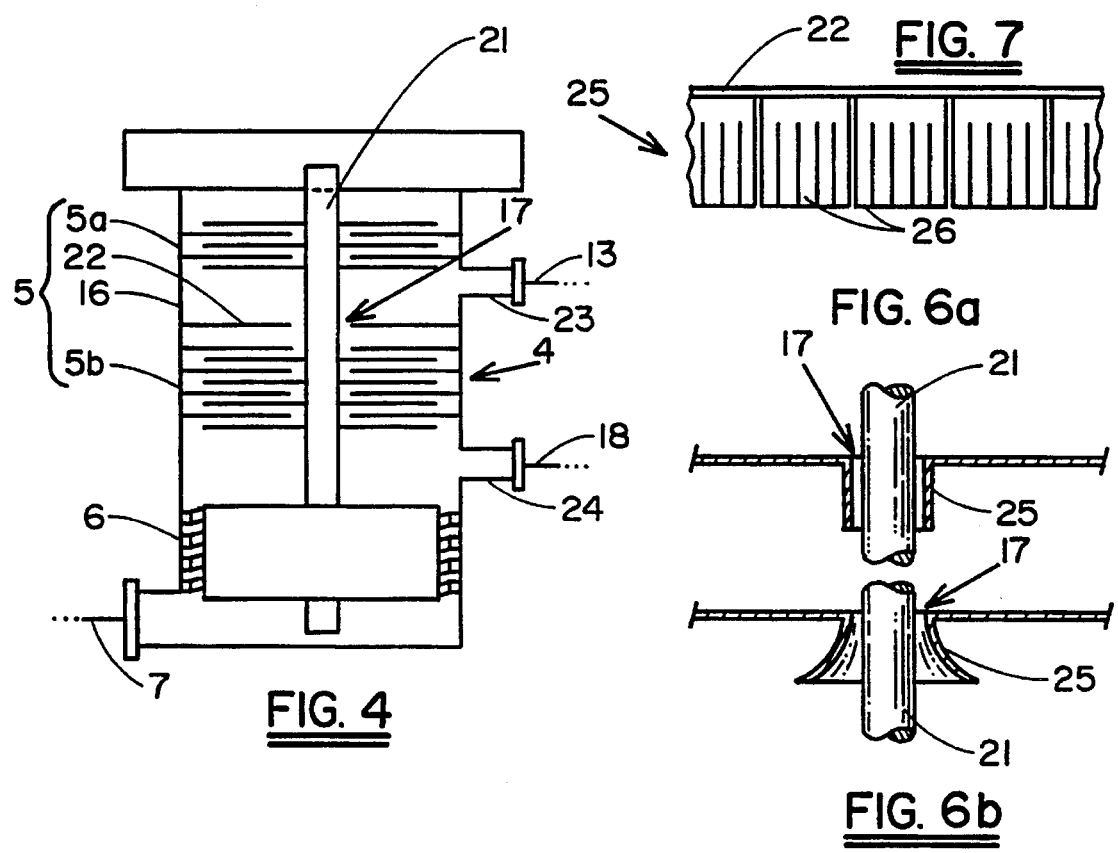

COUNTERFLOW LEAK-DETECTOR UNIT WITH A HIGH-VACUUM PUMP

BACKGROUND OF THE INVENTION

1. Field of the Invention

The invention concerns a counterflow leak-detector unit with an inlet to which a test specimen, or a chamber housing a test specimen, is connected and with a test-gas detector to which is connected a high-vacuum pump which produces the necessary pressure in the detector, the inlet to the leak-detector unit being connected to an intermediate line in the high-vacuum pump.

2. Discussion of the Prior Art

A leak-detector of this kind is known from DE-PS 31 24 205. The stage on the high-vacuum side with respect to the intermediate line is designed as a counterflow stage and has a relatively low compression for light gases, in particular for helium which is generally employed. The pump stage (pre-stage) on the forevacuum side with respect to the intermediate line serves—besides a forevacuum pump—to evacuate the specimen or the specimen chamber, so that relatively fast cycle times can be achieved. The pre-requisite for this is, that the pre-stage has a relatively high pumping speed. During the leak detection process the test gases are also admitted into the intermediate line of the high-vacuum pump. Due to the relatively high pumping speed of the pre-stage, sensitivity of the leak detection process is limited.

A counterflow leak-detector of the aforementioned kind is known from European Patent Publication 268 777, in which the inlet of the leak-detector unit is directly connectable to the test gas detector, i.e. to the inlet side of the high-vacuum pump. Due to this measure it is basically possible to increase sensitivity; but in practice this solution can hardly be employed. The test gas detector is commonly a highly sensitive mass spectrometer which is set to the mass of the test gas, and which requires an operating pressure of less then $10^{-4}$ mbar. Owing to the direct connection of the specimen to the test gas detector there exists the danger of an inadmissibly high pressure increase, which gives rise to faulty measurements or misinterpretations.

SUMMARY OF THE INVENTION

It is the task of the present invention to create a counter-flow leak-detection unit of the aforementioned kind, where measurements can be made with high sensitivity, without the danger of an inadmissibly high pressure increase in the test gas detector.

This task is solved by the present invention, by providing a constriction between the two stages of the high-vacuum pump separated by the intermediate line and by connecting the inlet of the leak-detector unit to the outlet side of the high-vacuum pump stage at a point upstream of the constriction. In a leak-detector designed in this fashion, the relatively high pumping speed of the pre-stage is not yet effective where the leak-detector unit is connected to the high-vacuum pump, i.e. upstream ahead of the constriction, so that at a given helium gas flow, a high test gas resp. helium partial pressure is created, which determines the sensitivity together with the relatively low compression of the counterflow stage. The presence of the constriction thus effects a considerable improvement in the sensitivity of the leak-detector unit designed according to the present invention, in comparison to the leak-detector unit known from DE-PS 31 24 205. The danger of an inadmissibly high pressure increase in the test gas detector (European Patent Publication 268 777) does not exist, because of the presence of the counterflow stage in the connection between the specimen and the test gas detector.

Preferably the inlet of the leak-detector is additionally also connectable to the inlet side of the pre-stage, i.e. downstream after the constriction, and preferably also to the outlet side of the pump stage on the forevacuum side. In such an arrangement it is possible to conduct the leak detection process at three different levels of sensitivity.

This task can also be solved through measures in which a constriction is provided in the intermediate line separating the pump stages of the high-vacuum pump, which is controllable or can at least be switched between two conductance levels, and so that the inlet of the leak-detector is connectable to the outlet side of the pump stage on the high-vacuum side, upstream ahead of the constriction. When the constriction is set to a low conductance it is then possible to conduct the leak detection process at a high sensitivity. When the conductance of the constriction is high the full pumping speed of the pre-stage takes effect in the intermediate line, so that—at a given flow of the helium gas—a lower partial pressure for helium is created, i.e. sensitivity is reduced.

BRIEF DESCRIPTION OF THE DRAWING

Further advantages and details of the present invention shall be explained on the basis of the design examples presented in drawing FIGS. 1 to 6. Shown are.

DETAILED DESCRIPTION OF THE PREFERRED EMBODIMENTS

Figure 1:
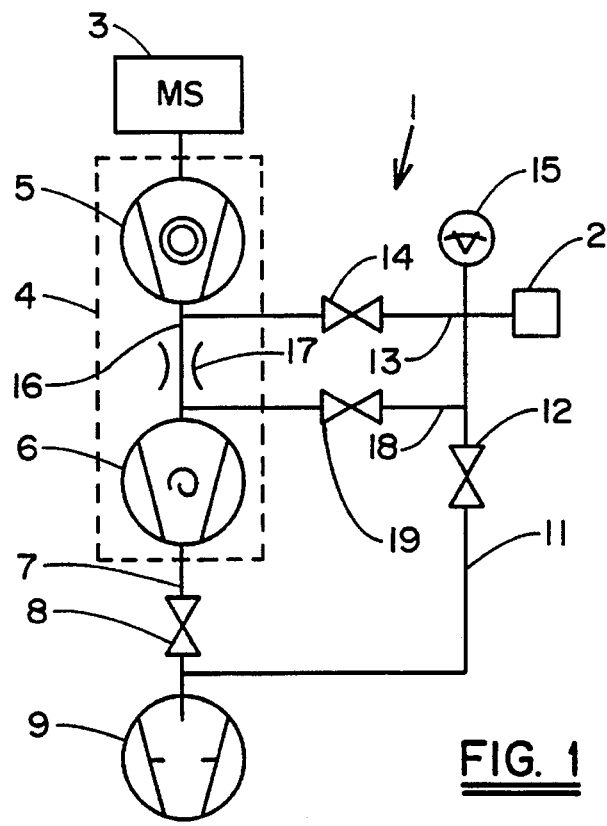
FIG. 1 a counterflow leak-detector according to the present invention with a fixed constriction between the two stages of the high-vacuum pump, FIG. 2 a counterflow leak-detector according to the present invention with a controllable constriction between the two stages of the high-vacuum pump, FIGS. 3 and 4 suitable high-vacuum pumps with a fixed constriction for a leak-detector of the kind according to the present invention, FIG. 5 a suitable high-vacuum pump with a controllable constriction for a leak-detector of the kind according to the present invention, as well as FIGS. 6 and 7 details of the high-vacuum pump according to drawing FIG. 5.
Figure 2:
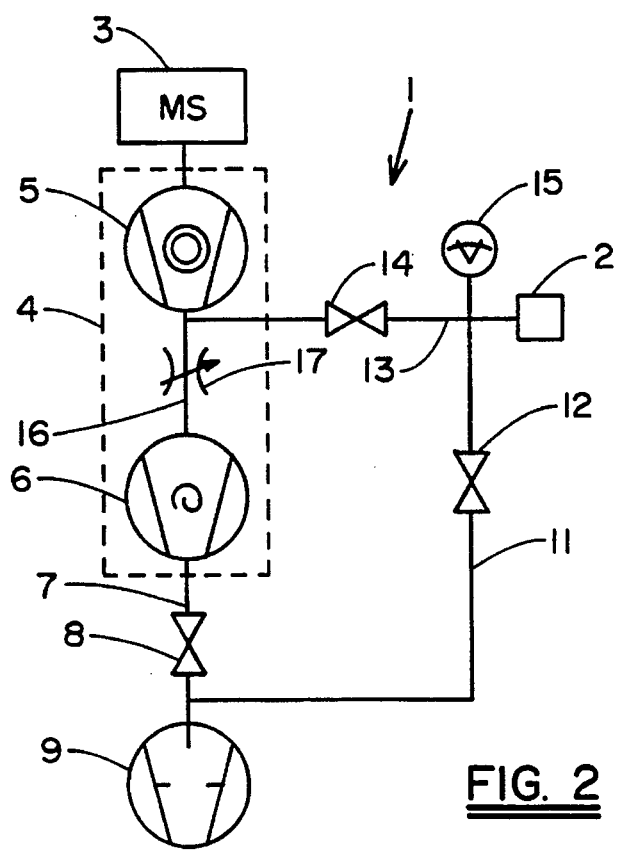

The counterflow leak-detectors 1 shown in drawing FIGS. 1 and 2 have a connection 2, to which a specimen or a chamber with specimens is connectable, depending on differential or integral leak detection requirements. A mass spectrometer serves as the test gas detector 3, the mass of which is set to helium, this being generally employed as the test gas.

A dual-stage high-vacuum pump 4 with pump stages 5 and 6 is employed for generation of the pressure (less than 10" mbar) required for operating the mass spectrometer 3. The mass spectrometer 3 is connected to the inlet side of pump stage 5 which is preferably implemented as a turbo-molecular pump stage. The outlet side of pump stage 6, which is preferably implemented as a drag pump, is connected via line 7 with valve 8 to the inlet side of the forevacuum pump 9. Also the connection 2 of the leak-detector 1 is connectable to the forevacuum pump 9 via line 11 with valve 12. Line 11 leads into line 7 between valve 8 and the forevacuum pump 9.

The leak-detectors 1 shown in drawing FIGS. 1 and 2 are designed as counterflow leak-detectors. Pump stage 5 has the function of a counterflow stage, i.e. the line 13 with valve 14 through which the test gas is applied to the mass spectrometer 3 from connection 2, is connected to the outlet side of the counterflow stage 5. Any possibly present helium will flow upstream into the pump stage 5. A pressure gauge which indicates the pressure in the area of connection 2 is designated as 15.

Drawing FIG. 1 shows, that in the transitional area between counterflow stage 5 and pre-stage 6 (intermediate line 16), a constriction 17 having a fixed conductance has been provided. Line 13 leads into the intermediate line 16 at a point upstream ahead of constriction 17. Pump stage 5 may be designed as a turbomolecular pump stage with a relatively low compression for light gases and dimensioned such that it will generate a pressure of approximately 0.1 mbar or less. Pump stage 6 may be designed as a screw-type pump stage having a relatively high pumping speed and dimensioned in such a way that it generates on its outlet side a pressure of over 0.1 mbar, and preferably 1 mbar. Additionally, line 16 is connectable to connection 2 through a further line 18 with valve 19 downstream after constriction 17. Thus it is possible to admit test gases into the intermediate line 16 ahead and after constriction 17. Valves 14 and 19 may also be replaced by a 3/2-way valve.

With the design example shown in drawing FIG. 1 there exists the possibility of performing leak-detections at three different levels of sensitivity. The leak detection process in performed as follows: At first the specimen which is not shown and which is connected to connection 2 is evacuated, whereby valves 8, 14, 19 are closed and where valve 12 is open. As soon as a forevacuum pressure has been attained, valve 8 may be opened and general counterflow leak detection may commence. An increase in sensitivity can be attained by opening valves 19 and 14 after each other. Leak detection will be highly sensitive while valve 14 is open, since—owing to the presence of constriction 17—the high pumping speed of pump stage 6 will have no effect at the point where line 13 leads into the intermediate line 16.

Also the pre-stage 6 may be employed for further evacuation of the specimen or vacuum chamber connected to connection 2—when valve 19 is open. Thus there exists the possibility of reliably preventing a backdiffusion of oil vapours from the forevacuum pump 9 into the specimen or the vacuum chamber. During the first evacuation phase by pump 9, the gas flow is laminar so that the possibility of backstreaming does not exist. Thereafter the specimen is no longer directly connected to pump 9. The molecular, i.e. the no longer laminar gas flow is pumped out via valves 19 or 14 and the pre-stage 6, which prevents any kind of backstreaming of oil vapours.

In the design example according to drawing FIG. 2, a constriction 17, the conductance of which is adjustable, is located in the intermediate line 16. In the case of this design, line 18 with valve 19 (drawing FIG. 1) can be omitted. When conductance of constriction 17 is high, sensitivity of the leak detection process is limited when valve 14 is open; when the conductance of constriction 17 is low, the leak detection process will be particularly sensitive.

High-vacuum pumps 4 suitable for a leak-detector according to the present invention are shown schematically in drawing FIGS. 3, 4 and 5. In each case, a dual-stage drag pump 4 is shown, the rotors of which are fitted to a common shaft 21. The first pumping stage 5 or 5a, 5b (FIG. 4) respectively, is in each case designed as a turbomolecular pump stage, whereby the rotor and stator blades are shown schematically, and said turbomolecular pump stage has a critical backing pressure of 0.1 mbar or less, for example. In the design example according to drawing FIG. 3, pump stage 6 is also a turbomolecular pump stage, whereas pump stage 6 according to drawing FIGS. 4 and 5 is a drag pump stage (with a cylinder-shaped rotor and a stator designed similar to a thread). The critical backing pressure for this pump stage 6 should significantly exceed 0.1 mbar, for example 1 mbar.

In the intermediate line 16 of the high-vacuum pump according to drawing FIG. 3, a constriction having a fixed conductance is provided. This consists of a ring disc 22 which is a fixed part of the housing, which together with shaft 21 forms an annular gap representing the constriction 17. Above and below of disc 22, connection ports 23 and 24 respectively, are provided to which lines 13 and 18 respectively, are connected.

In the design example according to drawing FIG. 4 the intermediate line 16 is located within turbomolecular pump stage 5, which is thus divided into two sections[1] 5a and 5b. Connection 23 with line 13 leads into the intermediate line 16 at a point upstream, ahead of constriction 17. Connection 24 with line 18 is located between the pump stages 5a, 5b and 6. By shifting the intermediate line 16 in the direction of the inlet of high-vacuum pump 4 it is possible to increase the sensitivity of the leak detection process—without changing the speed and thus the characteristics of the stages that follow. L6 [1] Translator's note: In the German text the singular ("Abschnitt"- "section") is used instead of the grammatically correct plural ("Abschnitte"- "sections"). The translation is such, that the grammatically correct plural has been assumed.

In the design example according to drawing FIG. 5, a constriction 17 which is adjustable to either of two levels of conductance, is located in the intermediate line 16. For this ring, disc 22 is equipped with a collar 25 consisting of metal having a shape memory effect. Components, designed like stator blades, which are made of metal having a shape memory effect and where the angle of incidence can be changed, are also conceivable for the formation of constriction 17.

If the conductance for constriction 17 according to drawing FIGS. 5 and 6 is to be low, collar 25 has an approximately cylindrical shape and extends in the axial direction with respect to shaft 21 (drawing FIGS. 5 and 6a). Conductance of the constriction 17 depends on the length of the annular gap between shaft 21 and collar 25 forming the constriction. Conductance may be increased by bending of collar 25 (unattached end towards the outside, drawing FIG. 6b).

This motion of the collar 25 can be realised with the aid of metal having shape memory effect. A design example for this is shown is drawing FIG. 7. Collar 25 is shown by way of a developed view. It consists of several metal strips 26, which are attached to ring disc 22. The metal strips are made of a metal having a shape memory effect. Bending of the metal strips is attained by heating the collar 25 above a certain temperature which depends on the type of metal having the shape memory effect. When this temperature threshold is exceeded, the metal strips bend in a previously impressed manner. Thermocoax which has been soldered to the lower end of the tube and which is equipped with temperature monitoring means, is used for heating. Thermocoax is a "heating filament" which is insulated by ceramics and which is located in a stainless steel tube (1 to 3 mm in diameter). Thus the Thermocoax may be soldered to the surfaces which are to be heated in a very simple manner. For the purpose of heating, a current is made to flow directly through the wire.

While this invention has been described in detail with reference to certain preferred embodiments, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A countertflow leak-detector that includes a gas detector for detecting the presence of a specimen;

a multistage high vacuum pump having an upper pump stage connected to the gas detector for bringing the pressure in said gas detector to a predetermined level and a second lower pump stage connected to the upper pump stage by an intermediate flow line, said pump stages each having an inlet side and an outlet side;

a constriction in said intermediate flow line;

a means for containing a specimen; and a connecting means for coupling said intermediate flow line and said means for containing a specimen, for introducing a specimen into said intermediate flow line.

2. The counterflow leak-detector according to claim 1, wherein said connecting means enters said intermediate flow line between said constriction and said upper pump stage.

3. The counterflow leak-detector according to claim 1, wherein said connecting means enters said intermediate flow line between said constriction and said lower pump stage.

4. The counterflow leak-detector according to claim 1, further comprising a common supply line (11) having a valve (12), operatively connected therein, said common supply line mounted between said outlet side of said lower pump stage and said means for containing a specimen.

5. The counterflow leak-detector according to claim 4, further comprising a lower line (7) having lower valve (8) and forevacuum pump (9), said forevacuum pump located on said outlet side of said lower pump stage, said common supply line connecting into said lower line between said lower valve and said forevacuum pump.

6. The counterflow leak-detector according to claim 1, wherein said constriction further comprises a means fur maintaining the conductance constant.

7. The counterflow leak-detector according to claim 6, wherein said means for maintaining the conductance includes a fixed ring disc (22), and said high-vacuum pump is a dual-stage drag pump.

8. The counterflow leak-detector according to claim 1, wherein said constriction further includes a means for controlling the conductance.

9. The counterflow leak-detector according to claim 8, wherein said means for controlling the conductance includes a ring disc (22) having adjustable components (26), and said high-vacuum pump is a dual-stage drag pump.

10. The counterflow leak-detector according to claim 9, wherein said components are made of materials having a shape memory effect capable of adjusting said constriction.

11. The counterflow leak-detector according to claim 1, wherein said upper pump stage and said lower pump stage are formed by two separate drag pumps.

12. The counterflow leak-detector according to claim 1, wherein said upper pump stage and said lower pump stage each having a separate rotor mounted on a common shaft (21).

13. The counterflow leak-detector according to claim 1, wherein said upper pump stage is a turbomolecular pump and said lower pump stage is a drag pump.

14. The counterflow leak-detector according to claim 1, wherein said upper pump stage is a turbomolecular pump with a relatively low compression for light gases and dimensioned such that it will generate on the pressure side a pressure of approximately 0.1 mbar or less, and wherein said lower pump stage is a screw-type pump having a relatively high pumping speed and dimensioned to produce on its outlet side a pressure of over 0.1 mbar, preferably 1 mbar.

15. The counterflow leak-detector according to claim 1, wherein said upper pump stage further contains two sections (5a, 5b).

16. The counterflow-leak detector according to claim 15, wherein said intermediate flow line is located between said two sections.

* * * * *